(12) United States Patent
Tanaka et al.

(10) Patent No.: US 8,242,973 B2
(45) Date of Patent: Aug. 14, 2012

(54) IMAGE SIGNAL PROCESSING APPARATUS, IMAGE SIGNAL PROCESSING METHOD, IMAGE PROJECTING SYSTEM, IMAGE PROJECTING METHOD, AND COMPUTER PROGRAM

(75) Inventors: Kenji Tanaka, Kanagawa (JP); Tetsujiro Kondo, Tokyo (JP); Tetsushi Kokubo, Kanagawa (JP); Hitoshi Mukai, Kanagawa (JP); Hirofumi Hibi, Kanagawa (JP); Kazumasa Tanaka, Chiba (JP); Hiroyuki Morisaki, Tokyo (JP)

(73) Assignee: Sony Corporation, Tokyo (JP)

( * ) Notice: Subject to any disclaimer, the term of this patent is extended or adjusted under 35 U.S.C. 154(b) by 968 days.

(21) Appl. No.: 12/254,388

(22) Filed: Oct. 20, 2008

(65) Prior Publication Data
US 2009/0161028 A1 Jun. 25, 2009

(30) Foreign Application Priority Data
Dec. 19, 2007 (JP) ................................. 2007-327923

(51) Int. Cl.
*H04N 5/74* (2006.01)
(52) U.S. Cl. ........ 345/4; 353/7; 353/8; 353/94; 348/744

(58) Field of Classification Search ...... 345/4; 348/744, 348/750; 353/7, 8, 94
See application file for complete search history.

(56) References Cited

U.S. PATENT DOCUMENTS
7,419,265 B2 * 9/2008 Relke et al. ...................... 353/7
7,614,748 B2 * 11/2009 Nayar et al. ..................... 353/7

FOREIGN PATENT DOCUMENTS
JP 2005-284592 10/2005
* cited by examiner

*Primary Examiner* — Amare Mengistu
*Assistant Examiner* — Joseph G Rodriguez
(74) *Attorney, Agent, or Firm* — Oblon, Spivak, McClelland, Maier & Neustadt, L.L.P.

(57) ABSTRACT

An image processing apparatus receives first and second input image signals and generates first and second projection image signals for projecting images from first and second projectors so as to be superimposed on a screen. A storage unit stores, for each projection position on the screen, intensity ratios between projected light from the first and second projectors when viewing from first and second viewing position. An intensity correcting unit adds the first and second input image signals in proportions set for generating the first projection image signal and in proportions set for generating the second projection image signal, according to the stored intensity ratios. The first projection image signal is supplied to the first projector and the second projection image signal is supplied to the second projector.

11 Claims, 11 Drawing Sheets

EXAMPLE WHEN VIEWING
DIAGONALLY FROM THE LEFT

FIG. 14B

EXAMPLE WHEN VIEWING
DIAGONALLY FROM THE RIGHT

FIG. 15

IMAGE SIGNAL PROCESSING APPARATUS, IMAGE SIGNAL PROCESSING METHOD, IMAGE PROJECTING SYSTEM, IMAGE PROJECTING METHOD, AND COMPUTER PROGRAM

CROSS REFERENCES TO RELATED APPLICATIONS

The present invention contains subject matter related to Japanese Patent Application JP 2007-327923 filed in the Japanese Patent Office on Dec. 19, 2007, the entire contents of which being incorporated herein by reference.

BACKGROUND OF THE INVENTION

1. Field of the Invention

The present invention relates to an image signal processing apparatus and an image signal processing method that generate image signals for projecting images onto a screen using projectors, a computer program for carrying out such processing method, an image projecting system and an image projecting method that project the generated image signals, and a computer program for carrying out such processing method.

2. Description of the Related Art

One example of a technology that has been developed in the past to allow different images to be viewed from different viewpoints is a stereoscopic display. For example, technology that displays a three-dimensional image by modulating light at an acousto-optic element to produce a three-dimensional computer-generated hologram in real time is known.

Also, naked eye stereoscopic displays and the like using ferroelectric liquid crystals have been developed.

A technology that uses a liquid crystal display panel to display different images when the panel is viewed from different viewpoints has also been developed and commercialized. As one example, this has been commercialized as an in-car display that displays a car navigation image when viewed from the driver's seat and displays images such as a television broadcast when viewed from the passenger's seat. In this case, the pixels on the display panel are divided into two groups, i.e., a group of pixels that can be seen from a viewpoint in one direction and another group of pixels that can be seen from a viewpoint in another direction, and the panel is constructed so that the respective pixel groups are only visible from specified viewing directions.

Japanese Unexamined Patent Application Publication No. 2005-284592 discloses one example of a technology that displays a plurality of images in a plurality of viewing directions.

SUMMARY OF THE INVENTION

However, existing technologies that display different images at a plurality of viewpoints may require a display panel, screen, or the like to use a special mechanism or special materials. Such constructions are both complex and costly, and there has been a further problem in that the resolution of the displayed images is not sufficiently high.

It is desirable to provide a technology that can display different images when viewed from a plurality of viewpoints, with high resolution, using a simple construction.

An image processing apparatus according to an embodiment of the present invention is constructed so as to receive an input of a first input image signal and a second input image signal and to generate first and second projection image signals for projecting projection images from a first projector and a second projector so as to be superimposed on a screen. The apparatus includes a storage unit and an intensity correcting unit.

The storage unit stores, for each projection position on the screen, an intensity ratio between projected light from the first projector and projected light from the second projector when viewing from a first viewing position and an intensity ratio between projected light from the first projector and projected light from the second projector when viewing from a second viewing position.

The intensity correcting unit adds the first input image signal and the second input image signal in proportions set for generating the first projection image signal according to the intensity ratios stored in the storage unit for each projection position. The intensity correcting unit also adds the first input image signal and the second input image signal in proportions set for generating the second projection image signal according to the intensity ratios stored in the storage unit for each projection position.

The first projection image signal generated by addition by the intensity correcting unit is supplied to the first projector and the second projection image signal generated by addition by the intensity correcting unit is supplied to the second projector.

The projection image projected based on the first projection image signal supplied to the first projector and the projection image projected based on the second projection image signal supplied to the second projector are superimposed on the same projection region of the screen, so that the projection images on the screen viewed at the respective viewing positions are composed of two projected images that have been superimposed. Here, by adding the first input image signal and the second input image signal so as to distribute the images between the projection image signals supplied to the respective projectors based on intensity ratios for projected light from the two projectors, it becomes possible to view an image based on one input image signal at one viewing position and another image based on the other input image signal at another viewing position.

According to an embodiment of the present invention, by appropriately generating the projection image signals to be supplied to the two projectors, different images are displayed when the screen is viewed from two viewing positions. When doing so, the process for generating the two images is carried out based on the intensity ratios for the projected light from the two projectors at the respective viewing positions, and therefore it is completely unnecessary to provide the screen or the like with a special construction for displaying two images. This means that two images can be displayed with a comparatively simple construction, and the resolution of the display images can be set at the same resolution as normal images, so that two images can be displayed favorably.

DESCRIPTION OF THE PREFERRED EMBODIMENTS

An embodiment of the present invention will now be described with reference to the attached drawings.

Figure 2:
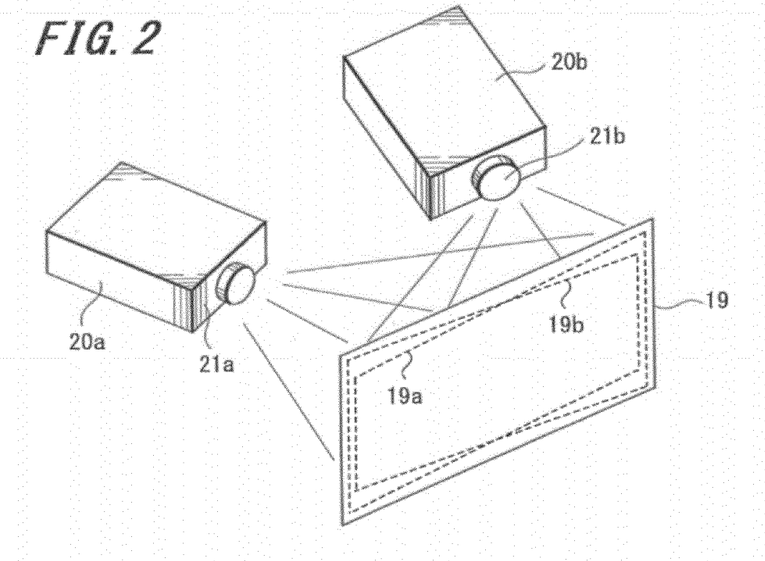
FIG. 2 is a diagram useful in showing one example of how images are projected according to an embodiment of the present invention.

First, the construction of a system that displays an image according to the present embodiment will be described with reference to FIG. 2. As shown in FIG. 2, in the present embodiment, two projectors, namely a first projector 20a and a second projector 20b, are provided. The system is constructed as a so-called "rear projection-type" projector where images are projected from projection lenses 21a, 21b of the two projectors 20a, 20b onto a rear surface of a single screen 19 so that users can view the projected images from the front surface side of the screen 19. The areas where the images are projected from the two projectors 20a, 20b onto the screen 19 a re overlapping (i.e., at the same position). To do so, a construction is used where the angled position from which images are projected by the first projector 20a onto the screen 19 and the angled position from which images are projected by the second projector 20b onto the screen 19 a re different and are both displaced from a direction that is perpendicular to the screen 19. Here, if the images projected from the respective projectors 20a, 20b were not corrected, the images would become trapezoidally distorted on the screen as shown by the ranges 19a, 19b indicated using the broken lines in FIG. 2. For this reason, in the present embodiment, such distortion is corrected so that the projected images from the two projectors 20a, 20b are correctly superimposed and displayed on the screen.

In the present embodiment, the combined image projected and displayed on the screen 19 is an image that differs according to the direction in which the screen 19 is viewed.

Next, the principles that enable two different images to be projected and displayed on a screen using two projectors will now be described with reference to FIGS. 3A to 10B in order.

Figure 3A:
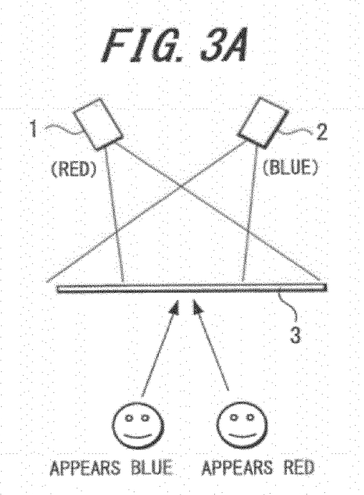
FIGS. 3A and 3B are diagrams useful in showing the principles used by an embodiment of the present invention.
Figure 3B:
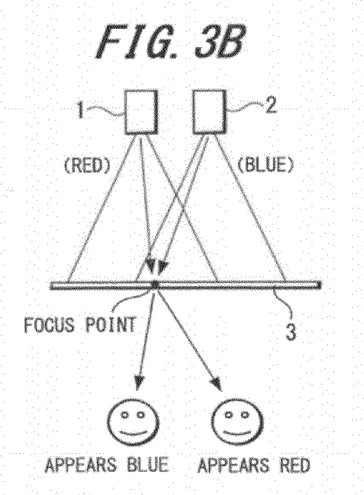

FIGS. 3A and 3B show one example where two projectors 1, 2 project images that are superimposed on a screen 3. This example is a construction where the projector 1 projects red light and the projector 2 projects blue light. The screen 3 is a screen for a rear projection-type projector, and instead of being a perfectly diffusing screen (i.e., a screen where the luminance does not change according to the direction), is a screen where luminance is directionally dependent. FIG. 3A shows the case where light is projected at an angle from two projectors 1, 2 onto the screen 3 (the light axes of the two projectors 1, 2 are not in parallel and are at angles to the screen 3) and FIG. 3B shows the case where light is projected onto the screen 3 from two projectors 1, 2 in parallel (the light axes of the two projectors 1, 2 are in parallel and perpendicular to the screen 3).

As one example, if light has been projected onto the screen 3 at an angle from two directions as shown in FIG. 3A, when viewing a point of region on the screen 3 where light from the projector 1 and light from the projector 2 are superimposed, the light will appear bluish from one direction and will appear reddish from another direction.

How the luminance and color of a certain point on the screen appears to the viewer is determined by the positional relationship between such point and the exit pupils of the respective projectors and the positional relationship between such point and the viewpoint of the viewer. As shown in FIG. 3B, even when the optical axes of the two projectors 1, 2 are disposed in parallel, in the same way as the case in FIG. 3A, different luminances will be observed at the same point (or same region) depending on the viewing direction. Note that although certain luminances and colors are observed at each point or region on the screen, since the observed color is determined by the total of the luminances of light of different bandwidths, in the following description, the term "luminance" includes the idea of "color".

Here, when the degree of longitude is expressed as "θ" and the degree of latitude as "φ", an arbitrary direction can be designated by $(\theta,\phi)$. The optical characteristics of the screen provided in a rear projection-type projector are such that when a point P on the screen is designated and the incident angle for light incident at such point P is designated as $(\theta,\phi)$, the luminance of light that reaches the viewer from such point P can be defined for the viewing direction $(\beta,\delta)$ as shown in Equation 1 below. Note that to simplify the explanation, the thickness of the dispersion layer of the screen is ignored and the point P is assumed to be included in the dispersion layer.

Equation 1

$$dI = d\theta d\phi f(\theta,\phi) g(\theta,\phi,\beta,\delta) \qquad (1)$$

In Equation 1, the term "$d\theta d\phi f(\theta,\phi)$" is the luminance of the light incident from the unit solid angle of the direction $(\theta,\phi)$. The term "$g(\theta,\phi,\beta,\delta)$" is the gain when light incident from the direction $(\theta,\phi)$ is observed from the unit solid angle of the direction $(\beta,\delta)$ and is a function that is unique to the screen.

At this time, the luminance on the screen when the screen is viewed from the direction $(\beta,\delta)$ is expressed by Equation 2 below.

Equation 2

$$I = \int d\theta d\phi f(\theta,\phi) g(\theta,\phi,\beta,\delta) \qquad (2)$$

Figure 4:
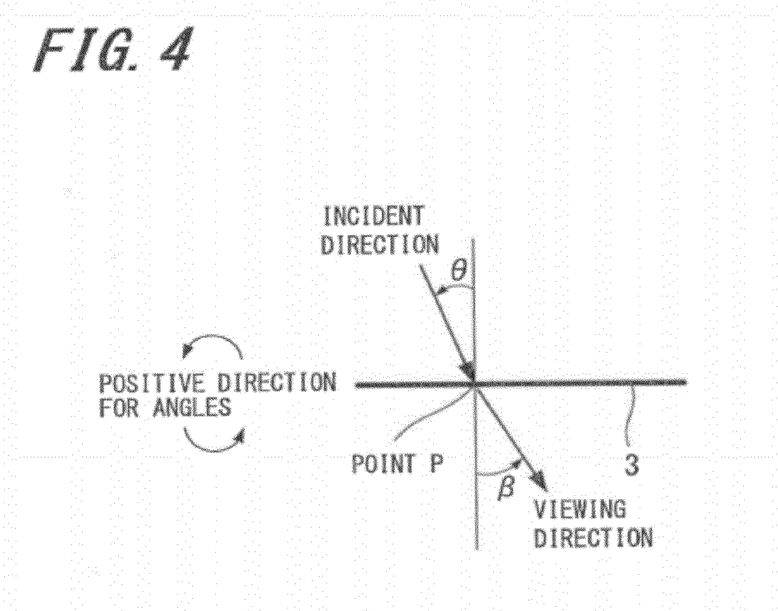
FIG. 4 is a diagram useful in showing an incident direction and a viewing direction for a screen.

To simplify the following explanation, the component of degree of longitude in direction is assumed to be zero, and only the incident direction θ of light and the viewing direction β are considered. FIG. 4 shows the relationship between the incident direction θ of light onto the screen and the viewing direction β.

Figure 5:
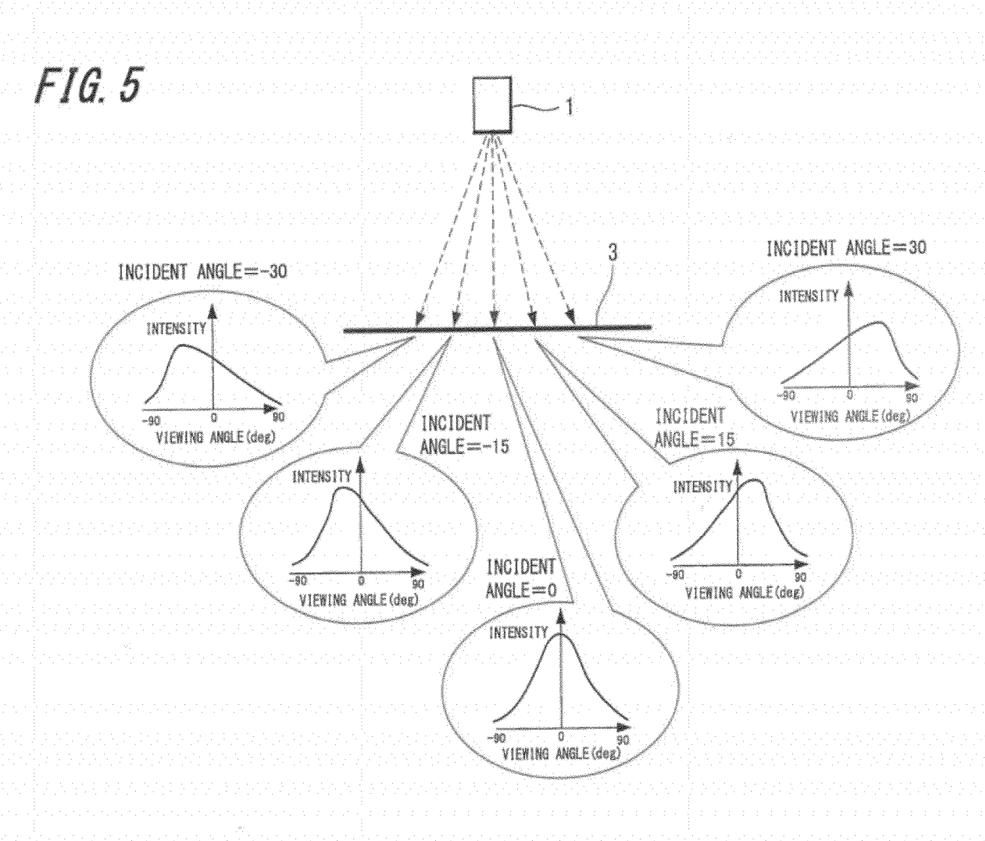
FIG. 5 is a diagram useful in explaining one example of the optical characteristics of the screen of a rear projector.

FIG. 5 shows an example of the optical characteristics of a screen used in a typical rear projection-type projector. In this example, the optical axis of the light from the projector 1 is disposed so as to be perpendicular to the screen 3. The respective graphs (characteristic graphs) in FIG. 5 show the relationship between the viewing angle and intensity (or gain) of light for different incident directions. In FIG. 5, five examples of incident directions where the incident angles are respectively 30°, 15°, 0°, −15°, and −30° are shown. Here, it can be understood that for the light at the respective incident angles, the light intensity changes when the viewing angle is changed and the manner in which the light intensity changes greatly differs according to the viewing angle.

Figure 6:
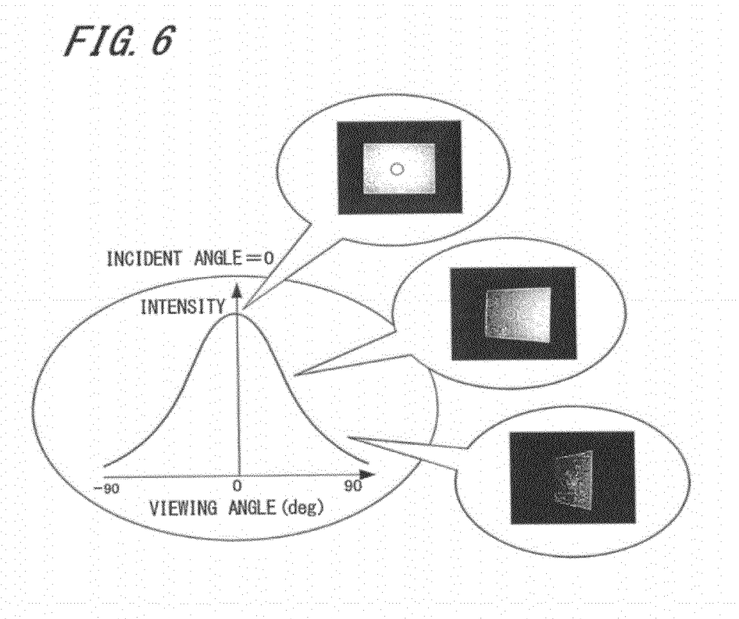
FIG. 6 is another diagram useful in explaining one example of the optical characteristics of the screen of a rear projector.

FIG. 6 shows an example of how projected images actually appear on the screen depending on the viewing angles. In the example in FIG. 6, the incident angle is 0°, and the intensity of such light with the incident angle of 0° is maximized when the viewing angle is also 0°.

Figure 7:
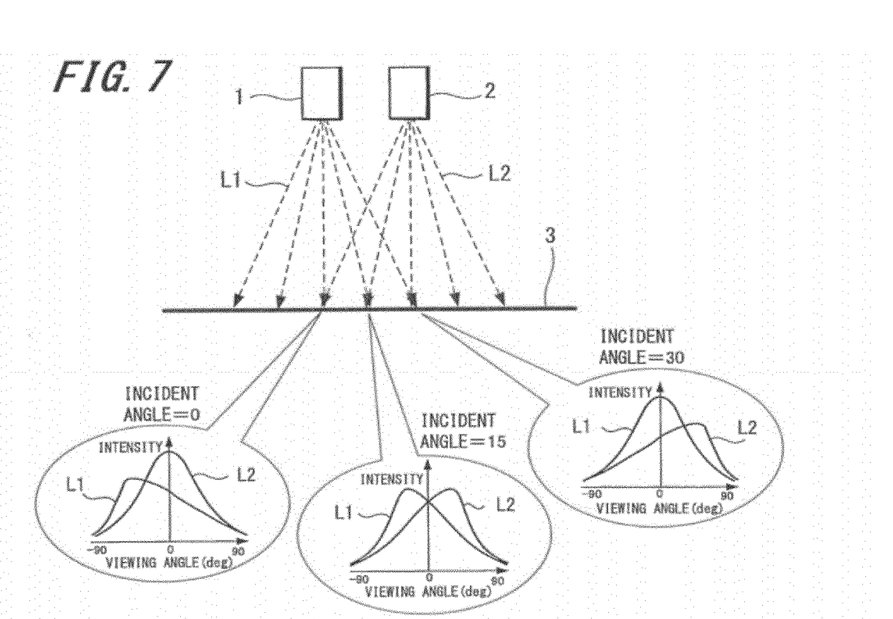
FIG. 7 is a diagram showing the principle whereby the same region appears as different colors depending on the viewing direction.

FIG. 7 shows how a region where light from the projector 1 and light from projector 2 a re superimposed appears at different viewing directions on a screen with the optical characteristics shown in FIG. 5 for the same different angles as in FIG. 5. This example shows the case where the arrangement in FIG. 39 is used, that is, where the projectors 1, 2 are disposed such that the optical axes thereof are in parallel and perpendicular to the screen 3. In FIG. 7, light from the projector 1 is shown as L1 and light from the projector 2 is shown as L2. Note that the incident angles shown in FIG. 7 are incident angles for the light L1 from the projector 1.

For example, although the intensity of the light L1 is maximized when the light L1 with an incident angle of 0° from the projector 1 is viewed with a viewing angle of 0°, the intensity of the light L2 from the projector 2 is maximized at a different viewing angle. The characteristics of such changes differ at each incident angle as shown in FIG. 7. Note that since the component of the degree of longitude is assumed to be zero degree in the graphs shown in FIG. 5 and FIG. 7, the term $g(\theta,\phi,\beta,\delta)$ in Equation 1 and Equation 2 above becomes $g(\theta 0, \beta, 0)$.

In this way, when images are projected onto the same region by a plurality of projectors, it will be possible to calculate the appearance of the region at different viewing directions with relatively high accuracy so long as the term $g(\theta,\phi,\beta,\delta)$, that is, viewing direction-intensity curves such as those shown in the graphs in FIG. 7, can be calculated. By using such curves, it is possible to adjust the output images of the projectors 1, 2 in advance so that the desired appearance can be correctly produced when viewing from a given viewing direction.

In the example in FIG. 7, two projectors 1, 2 are aligned in the horizontal direction, but the same effect can be achieved with a construction where two projectors are aligned in the perpendicular direction to the screen.

A correction process to display two images on the screen, that uses such viewing direction-intensity curves, will now be described.

Figure 8:
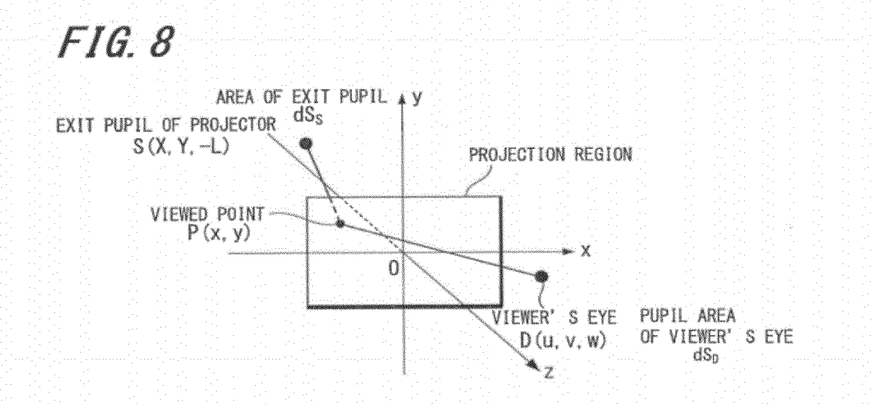
FIG. 8 is a diagram useful in defining a coordinate system and various points.

First, the coordinate system and various points are defined as shown in FIG. 8. As shown in FIG. 8, when the horizontal direction of the screen is set as the x axis and the vertical direction is set as the y axis, a viewed point is expressed as P(x,y) and the exit pupil of a projector located at a point S is expressed as S(X,Y,−L). The area of the exit pupil of the projector is set as $dS_S$, the viewpoint position (i.e., eyes) of the viewer is set as D(u,v,w), and the pupil area of the viewer's eyes is set as $dS_D$. Here, L is the distance between the projector and the screen.

When these definitions are used, out of the luminance of the viewed point on the screen due to the projector positioned at the point S, the luminance (intensity) of the light that reaches the viewer is given by Equation 3 below.

Equation 3

$$I(S, D, P) = \int d\theta d\phi f(\theta(\vec{PS}), \phi(\vec{PS}))g(\theta(\vec{PS}), \phi(\vec{PS}), \quad (3)$$

$$\beta(\vec{PD}), \delta(\vec{PD}))\frac{dS_D \cos\theta(\vec{PD})\cos\phi(\vec{PD})}{|\vec{PD}|^2}$$

$$= \frac{dS_S I_S \cos\theta(\vec{PS})\cos\phi(\vec{PS})}{|\vec{PS}|^2} g(\theta(\vec{PS}), \phi(\vec{PS}),$$

$$\beta(\vec{PD}), \delta(\vec{PD}))\frac{dS_D \cos\theta(\vec{PD})\cos\phi(\vec{PD})}{|\vec{PD}|^2}$$

$$= \frac{dS_S I_S L}{((X_S - x)^2 + (Y_S - y)^2 + L^2)^{1.5}} g(\theta(\vec{PS}),$$

$$\phi(\vec{PS}), \beta(\vec{PD}), \delta(\vec{PD}))$$

$$\frac{dS_D w}{((u - x)^2 + (v - y)^2 + w^2)^{1.5}}$$

Here, $\theta(PS)$ is defined as the angle $\theta$ when looking in the direction of the point S from the point P, and $I_S$ is defined as the luminance of the viewed point on the screen due to the projector positioned at the point S.

On the other hand, among the luminance of the viewed point on the screen due to the projector positioned at the point T, the luminance (intensity) of light that reaches the viewer is expressed as follows.

Equation 4

$$I(T, D, P) = \int d\theta d\phi f(\theta(\vec{PT}), \phi(\vec{PT}))g(\theta(\vec{PT}), \phi(\vec{PT}), \quad (4)$$

$$\beta(\vec{PD}), \delta(\vec{PD}))\frac{dS_D \cos\theta(\vec{PD})\cos\phi(\vec{PD})}{|\vec{PD}|^2}$$

$$= \frac{dS_T I_T \cos\theta(\vec{PT})\cos\phi(\vec{PT})}{|\vec{PT}|^2} g(\theta(\vec{PT}), \phi(\vec{PT}),$$

$$\beta(\vec{PD}), \delta(\vec{PD}))\frac{dS_D \cos\theta(\vec{PD})\cos\phi(\vec{PD})}{|\vec{PD}|^2}$$

$$= \frac{dS_T I_T L}{((X_T - x)^2 + (Y_T - y)^2 + L^2)^{1.5}} g(\theta(\vec{PT}),$$

$$\phi(\vec{PT}), \beta(\vec{PD}), \delta(\vec{PD}))$$

$$\frac{dS_D w}{((u - x)^2 + (v - y)^2 + w^2)^{1.5}}$$

Here, if it is assumed that the sizes of the exit pupils of the projectors positioned at the points S, T are equal and (X-x) and (Y-y) are sufficiently small values compared to the distance L between the projector and the screen, the ratio between I(T,D,P) and I(S,D,P) is expressed by Equation 5 below.

Equation 5

$$\alpha = \frac{I(T, D, P)}{I(S, D, P)} \quad (5)$$

$$= \frac{g(\theta(\vec{PS}), \phi(\vec{PS}), \beta(\vec{PD}), \delta(\vec{PD}))}{g(\theta(\vec{PT}), \phi(\vec{PT}), \beta(\vec{PD}), \delta(\vec{PD}))}$$

The ratio α in Equation 5 is a value showing the luminance of the image produced by one of the projectors in a given region as a multiple of the luminance of the image produced by the other projector.

To simplify the explanation, assuming that the luminance ratio α is the same value across every part in the region in question, the conditions where the desired images can be viewed in a state where images from two projectors are superimposed can be found as follows. First, the total of the incident direction and viewing direction is set at 180°. Here, the expression "the total is set at 180°" means that there is line symmetry between the projector and viewing direction about a plane that includes a normal to the screen.

The conditions whereby the total of the two projected images produce the desired output can be calculated by solving Equation 6 below for a given pixel. Here, the ratio described above is set as α, the luminance value of a pixel of a first image out of the input images is B, the luminance of the viewed point on the screen due to one of the projectors is $a^\gamma$, the luminance of the viewed point on the screen due to the other projector is $b^\gamma$, and p and q are constants. The constant p is an offset and the constant q is the dynamic range of the luminance. The offset p is a grayscale level of an image that is actually viewed. Since addition and subtraction are normally carried out between the images being viewed, a grayscale is added as an offset in advance. The dynamic range q is a luminance scale for the image. When this value is small, the range of possible values for the pair of luminance values A and B of pixels is large. Also, γ (gamma) is the gamma characteristic.

Equation 6

$$\begin{pmatrix} 1 & \alpha \\ \alpha & 1 \end{pmatrix}\begin{pmatrix} a^\gamma \\ b^\gamma \end{pmatrix} = \begin{pmatrix} (p+qA)^\gamma \\ (p+qB)^\gamma \end{pmatrix} \quad (6)$$

Solving Equation 6 gives Equation 7.

Equation 7

$$\begin{pmatrix} a^\gamma \\ b^\gamma \end{pmatrix} = \frac{1}{1-\alpha^2}\begin{pmatrix} 1 & -\alpha \\ -\alpha & 1 \end{pmatrix}\begin{pmatrix} (p+qA)^\gamma \\ (p+qB)^\gamma \end{pmatrix} \quad (7)$$

Accordingly, the luminance a of one projector and the luminance b of the other projector are calculated by Equation 8 and Equation 9 below. By calculating the luminances a, b for each pixel in the image, the images to be outputted from the two projectors are calculated.

Equation 8

$$a = \left(\frac{(p+qA)^\gamma - \alpha(p+qB)^\gamma}{1-\alpha^2}\right)^{\frac{1}{\gamma}} \quad (8)$$

Equation 9

$$b = \left(\frac{-\alpha(p+qA)^\gamma + (p+qB)^\gamma}{1-\alpha^2}\right)^{\frac{1}{\gamma}} \quad (9)$$

Equation 6 to Equation 9 are examples where the states of the points on the screen are approximated.

Figure 10A:
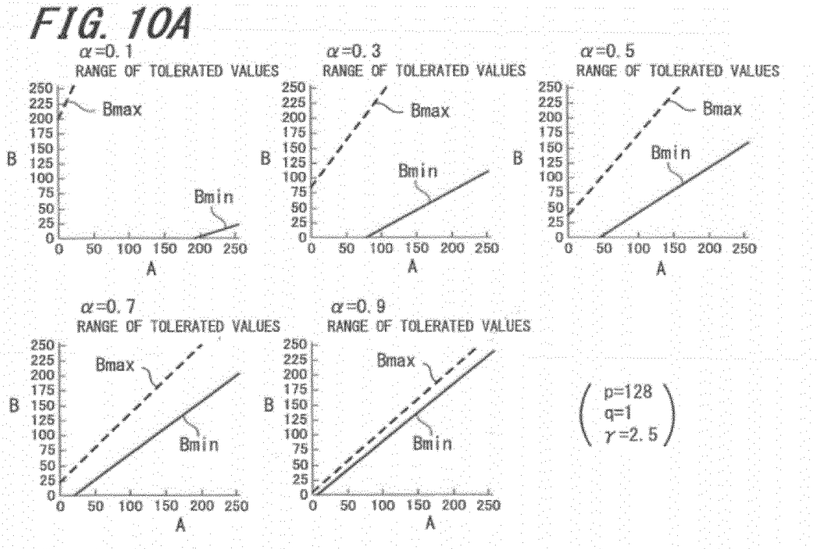
FIGS. 10A and 10B are diagrams showing combinations of values according to an embodiment of the present invention.
Figure 10B:
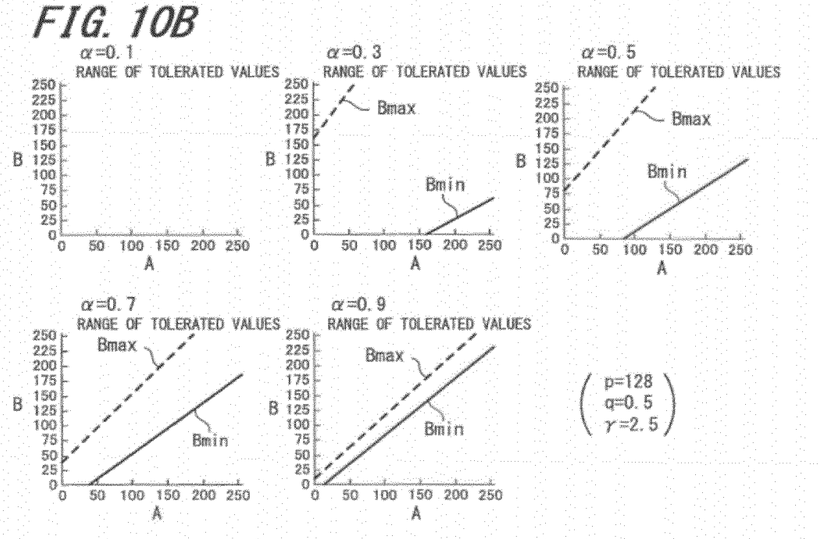

Note that when images from two projectors are actually projected onto and superimposed on a screen, the superimposing of images is physically a process of addition and subtraction is not possible. That is, the luminances a and b in Equations 8 and 9 being the output values of the projectors, the values are required to be positive values (i.e., values that are not negative). To satisfy this condition, Equation 10 or Equation 11 below is required. Note that examples of the ranges of possible values will be described later (FIGS. 10A and 10B).

Equation 10

$$\alpha^{\frac{1}{\gamma}} < \frac{p+qB}{p+qA} < 1 / \alpha^{\frac{1}{\gamma}} \quad (10)$$

Equation 11

$$\alpha^{\frac{1}{\gamma}} < \frac{1+kB}{1+kA} < 1 / \alpha^{\frac{1}{\gamma}} \quad (11)$$

Figure 9:
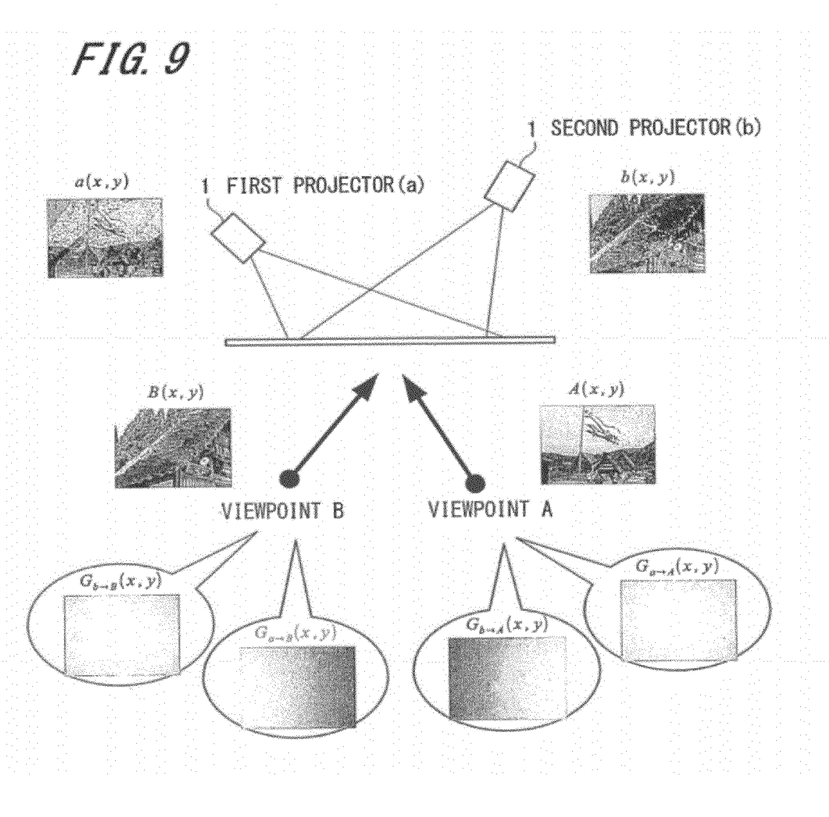
FIG. 9 is a diagram useful in showing a formulation of example processing according to an embodiment of the present invention.

Here, when the relationship between the output values a, b from the two projectors 1, 2 and the viewpoints A, B is as shown in FIG. 9, the generalized equation is Equation 12 below. Equation 12 is a generalized version of Equation 6, and by calculating an inverse matrix for each pixel, highly precise results can be obtained.

Equation 12

$$\begin{pmatrix} G_{a \to A}(x,y) & G_{b \to A}(x,y) \\ G_{a \to B}(x,y) & G_{b \to B}(x,y) \end{pmatrix}\begin{pmatrix} a(x,y)^\gamma \\ b(x,y)^\gamma \end{pmatrix} = \begin{pmatrix} (p+qA(x,y))^\gamma \\ (p+qB(x,y))^\gamma \end{pmatrix} \quad (12)$$

Next, an exemplary structure of an apparatus according to an embodiment of the invention, that uses the principles described thus far, will now be described with reference to FIG. 1.

Figure 1:
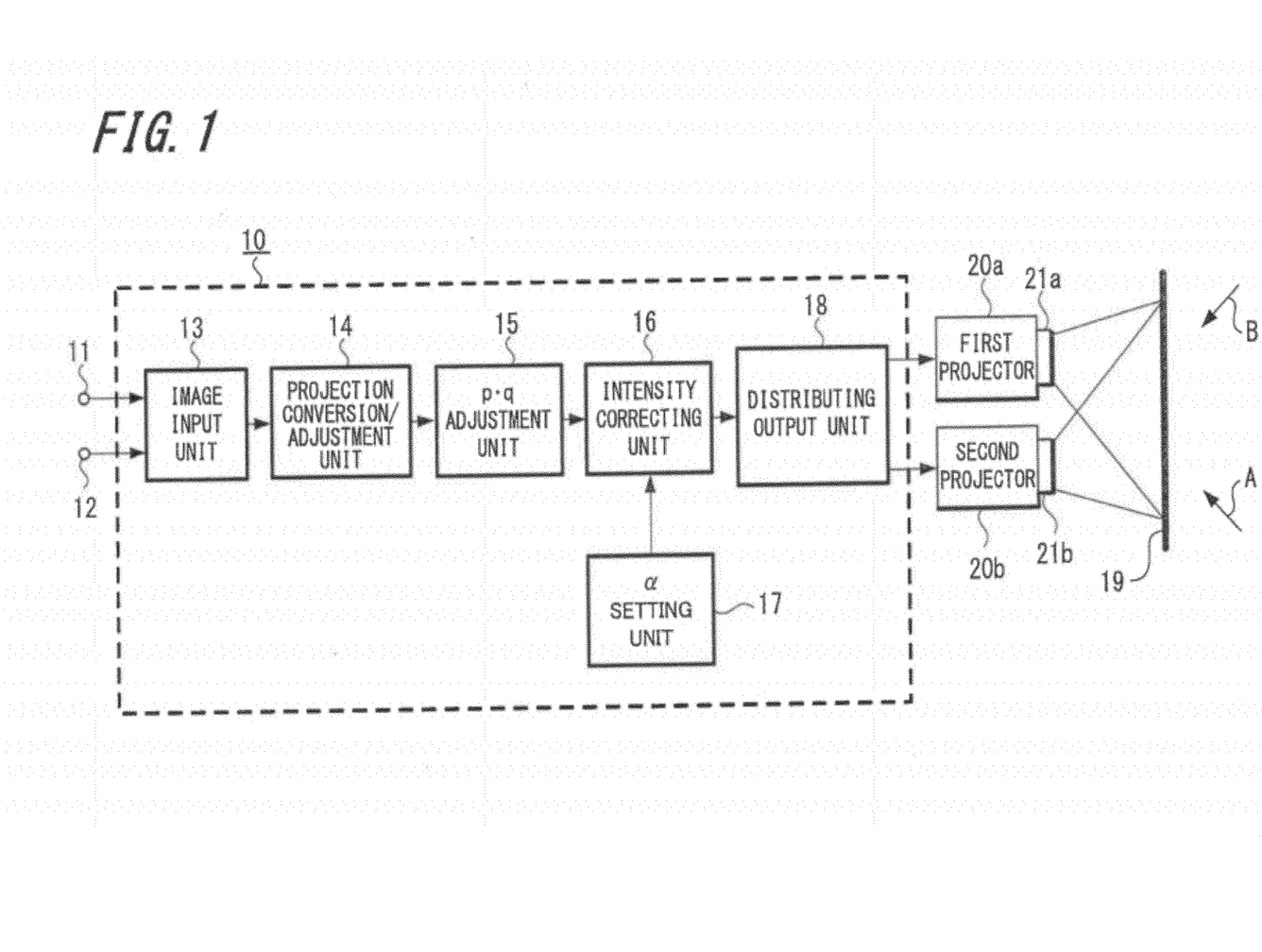
FIG. 1 is a block diagram showing an example construction of an apparatus according to an embodiment of the present invention.

The construction shown in FIG. 1 includes an image processing apparatus 10. An image signal for a first projector 20*a* and an image signal for a second projector 20*b* generated by the image processing apparatus 10 are respectively supplied to the projectors 20*a*, 20*b* to project projection images from the projectors 20*a*, 20*b* so as to be superimposed on a single screen 19.

The image processing apparatus 10 includes two image signal input terminals 11, 12 into which different image signals are inputted. The image signal obtained at the input terminal 11 is a signal of an image to be displayed to the user viewing from the viewpoint A and the image signal obtained at the input terminal 12 is a signal of an image to be displayed to the user viewing from the viewpoint B.

The image signals obtained by both input terminals 11, 12 are supplied from an image input unit 13 to a projection conversion/adjustment unit 14. The projection conversion/adjustment unit 14 carries out a correction process that corrects the distortion of projected images on the screen described above with reference to FIG. 2. That is, the uncorrected state where images become trapezoidally distorted like the regions 19*a*, 19*b* shown by the broken lines in FIG. 2 is corrected so as to produce the proper rectangular images on the screen. Here, the image signal obtained by the input terminal 11 (i.e., the first image signal) is subjected to correction so that the projected image is not distorted when projected from the first projector 20*a* and is also subjected to correction so that the projected image is not distorted when projected from the second projector 20b. In the same way, the image signal obtained by the input terminal 12 (i.e., the second image signal) is subjected to correction so that the projected image is not distorted when projected from the first projector 20a and is also subjected to correction so that the projected image is not distorted when projected from the second projector 20b.

The first image signal and the second image signal that are converted for projection are respectively supplied to a p·q adjustment unit 15 where the constants p and q are adjusted. As described above with reference to Equation 6, the constants p and q are set so that the constant p is the offset and the constant q is the dynamic range of luminance. The offset p is a value that corresponds to a grayscale level of the image signal. The dynamic range q is a luminance scale.

Both image signals that have been respectively adjusted by the p·q adjustment unit 15 are supplied to an intensity correcting unit 16 that carries out a calculation process to generate the image signals that are respectively supplied to the projectors 20a, 20b. The calculation process by the intensity correcting unit 16 is carried out according to the equations given above. The intensity ratios α for the two projectors at the respective display positions (pixel positions) on the screen, that are required during correction processing by the intensity correcting unit 16, are stored in advance in a α setting unit 17, and by using the ratios α stored in the α setting unit 17, the calculation processing by the intensity correcting unit 16 is carried out. This calculation processing is carried out for each display position (pixel position) on the screen to generate the image signals supplied to the respective projectors to produce the image viewed from the viewpoint A and the image viewed from the viewpoint B.

The image signal for the first projector outputted by the intensity correcting unit 16 is outputted from a distributing output unit 18 and is supplied to the first projector 20a. The image signal for the second projector outputted by the intensity correcting unit 16 is outputted from a distributing output unit 18 and is supplied to the second projector 20b.

At the first projector 20a, the image light to be projected according to the supplied image signal is generated and is projected onto the rear surface of the screen 19 from the projection lens 21a. At the second projector 20b also, the image light to be projected according to the supplied image signal is generated and is projected onto the rear surface of the screen 19 from the projection lens 21b. Both projectors 20a, 20b project light on matching positions on the screen 19.

Figure 11:
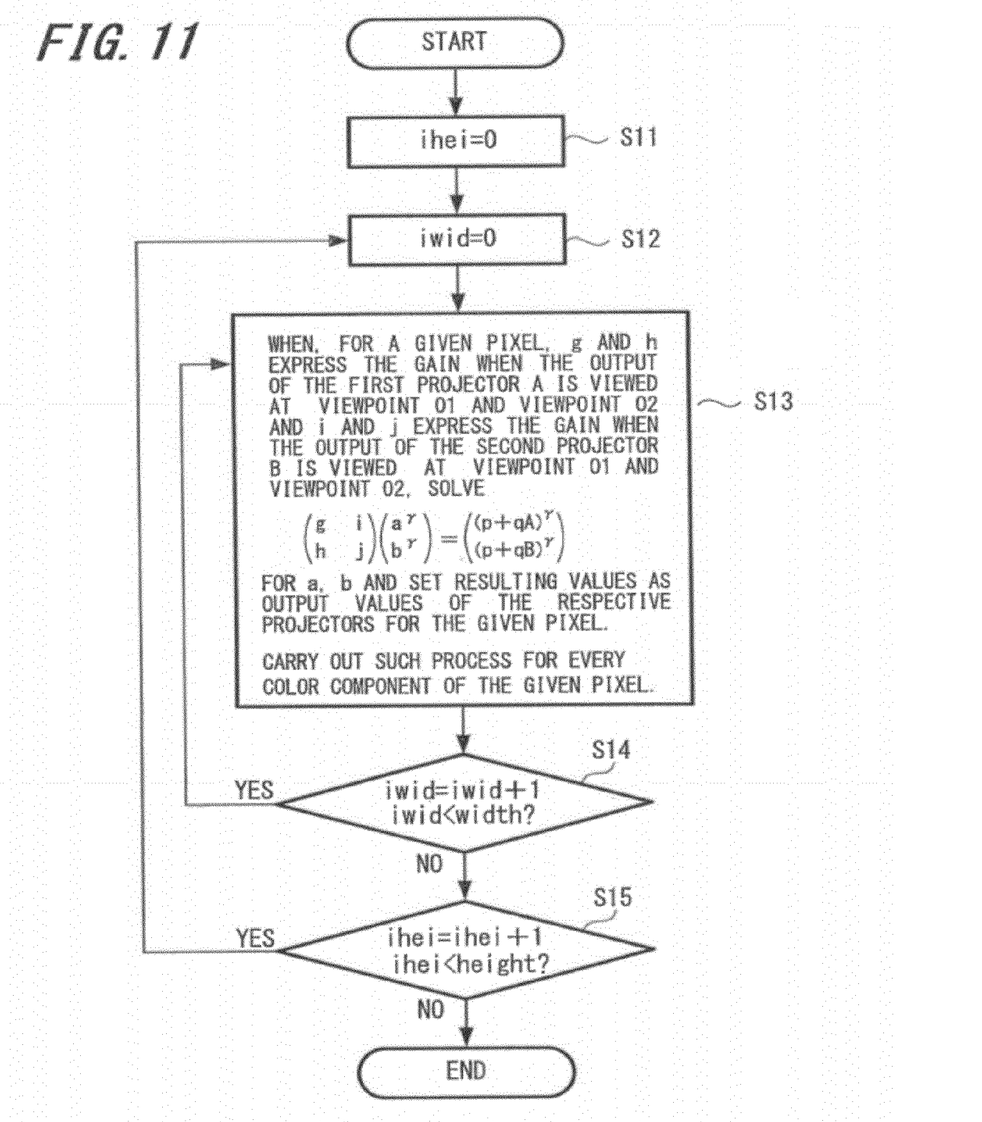
FIG. 11 is a flowchart showing an example of processing according to an embodiment of the present invention.

The calculation processing by the intensity correcting unit 16 is shown by the flowchart in FIG. 11.

The flowchart shown in FIG. 11 shows the processing for an image of one frame. First, a pixel position in the vertical direction is set as the start point (step S11), and a pixel position in the horizontal direction is also set as the start point (step S12).

After this, a calculation process based on the equations described above is carried out on the pixel at such horizontal and vertical positions (step S13). More specifically, a calculation process based on the next equation is carried out where, for a given pixel, g and h express the gains when the output of the first projector is viewed at the respective positions of the viewpoint O1 and the viewpoint O2, and i and j express the gains when the output of the second projector is viewed at the respective positions of the viewpoint O1 and the viewpoint O2.

Equation 13

$$\begin{pmatrix} g & i \\ h & j \end{pmatrix} \begin{pmatrix} a^\gamma \\ b^\gamma \end{pmatrix} = \begin{pmatrix} (p+qA)^\gamma \\ (p+qB)^\gamma \end{pmatrix}$$

Based on this equation, a and b are solved, and the values a and b are set as the output values for the respective projectors with respect to the pixel at the position set in the steps S11 and S12. When the respective pixels in the image signals are composed of a red signal R, a blue signal B, and a green signal G, for example, the processing that calculates the pixel values is carried out separately for each color signal.

After this, one is added to the pixel value showing the pixel position in the horizontal direction and it is determined whether the added sum exceeds the number of pixels in the horizontal direction (step S14). When such number is not exceeded, the processing in step S13 is carried out on the signal at the newly set pixel position.

In step S14, when the added sum showing the pixel position in the horizontal direction exceeds the number of pixels in the horizontal direction of the image signal being processed at this time, the processing proceeds to step S15 where one is added to the pixel value that shows the pixel position in the vertical direction so that the processing moves to the next horizontal line. At this time, it is determined whether the added sum exceeds the number of pixels in the vertical direction (i.e., the number of horizontal lines), and when the number is not exceeded, the processing proceeds to step S12, the pixel position in the horizontal direction is reset, and the processing in step S13 is carried out on the signal of a pixel position on the newly set horizontal line.

If the added sum showing the horizontal line position in step S15 exceeds the number of horizontal lines in the image signal being processed at this time, the processing for all of the pixels in the current frame is completed, and the processing stands by until the image of the next frame is inputted.

FIGS. 12A to 14 show examples where two images are actually displayed simultaneously by the processing in the present embodiment.

Figure 12A:
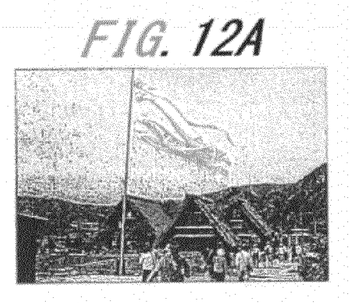
FIGS. 12A and 12B are views of two original images according to an embodiment of the present invention.
Figure 12B:
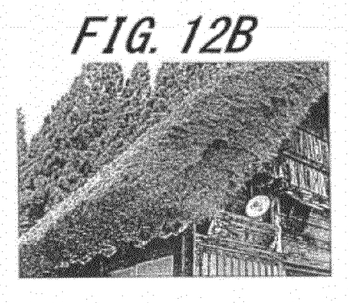

FIGS. 12A and 12B show examples of two images produced by two image signals obtained by the input terminals 11, 12 in FIG. 1. That is, as one example, an image signal for displaying the image shown in FIG. 12A is obtained in the input terminal 11 and an image signal for displaying the image shown in FIG. 12B is obtained in the input terminal 12.

Figure 13A:
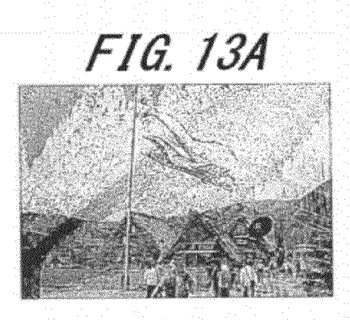
FIGS. 13A and 13B are views showing one example of two projected images according to an embodiment of the present invention.
Figure 13B:
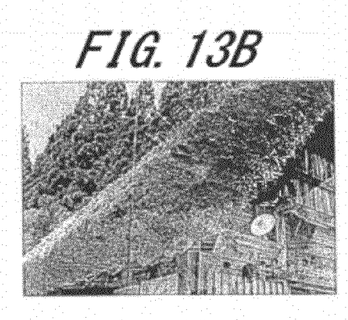

At this time, the image signal generated by the correction process by the intensity correcting unit 16 and supplied to the first projector 20a is a signal for displaying the image shown in FIG. 13A, and the image signal generated by the intensity correcting unit 16 also and supplied to the second projector 20b is a signal for displaying the image shown in FIG. 13B, and the respective images are projected onto the screen 19 as projected light.

The two projected images shown in FIG. 13 are images where the two images shown in FIGS. 12A and 12B are combined, and the combined state at each pixel position is calculated based on the intensity ratio at the respective viewed positions.

Figure 14A:
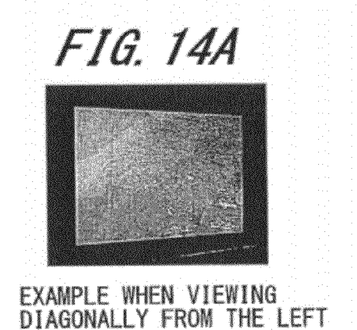
FIG. 14 is a diagram showing one example where the screen is viewed from two directions according to an embodiment of the present invention.
Figure 14B:
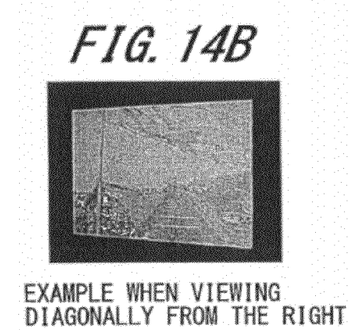

By projecting the image shown in FIG. 13A and the image shown in FIG. 13B onto the screen in a state where the projected areas are superimposed, as shown in FIG. 14, the image shown in FIG. 12A appears when the screen is viewed diagonally from the right and the image shown in FIG. 12B appears when the screen is viewed diagonally from the left, so that only one out of the two images can be seen at the respective viewing positions. However, when the processing in step S13 is carried out, it is necessary to set one of the viewing positions as diagonally to the right and the other of the viewing positions as diagonally to the left in advance. When changing the respective viewpoint positions, it is necessary to set the ratios α corresponding to the viewpoint positions in the α setting unit 17.

Note that as described earlier with reference to Equations 10 and 11, both of a and b (output values of the projectors) need to be set at non-negative values for the luminance values A, B of the respective pixels in the signals for projecting projection images from the two projectors 20a, 20b to determine the range (i.e., the tolerated values) for the luminance values A, B of the respective pixels.

By deciding the values of the parameters p, q, γ, α described earlier that are required for calculation, the luminance values A, B of each pixel in the signals for projecting projection images from the two projectors 20a, 20b, that can be tolerated, are decided.

FIGS. 10A and 10B are graphs showing examples of the tolerated ranges for the luminance values A, B of each pixel. As one example, the luminance values (pixel values) A and B are values in a range of 0 to 255, the luminance value A of each pixel to be projected from one of the projectors is shown on the horizontal axis and the luminance value B each pixel to be projected from the other projector is shown on the vertical axis. In the respective graphs, by selecting the luminance values (pixel values) from the range between the maximum value Bmax and the minimum value Bmin, it is possible to simultaneously display the two images as described above using the equations given earlier.

FIG. 10A shows an example where the offset p is 128, the dynamic range of the luminance q is 1, and γ is 2.5. When such values are set and the intensity ratio α is 0.1, as shown in FIG. 10A, the range between the maximum value Bmax and the minimum value Bmin can be set comparatively widely. On the other hand, as the intensity ratio α approaches 1 (values up to the ratio α=0.9 are shown in FIG. 10A), the tolerated range between the maximum value Bmax and the minimum value Bmin becomes progressively narrower.

FIG. 10B shows an example where the offset p is 128, the dynamic range of the luminance q is 0.5, and γ is 2.5. When such values are set and the intensity ratio α is 0.1, as shown in FIG. 10B, there is no limit on the range between the maximum value Bmax and the minimum value Bmin. On the other hand, as the intensity ratio α approaches 1 (values up to the ratio α=0.9 are shown in FIG. 10B), the tolerated range between the maximum value Bmax and the minimum value Bmin becomes progressively narrower.

In this way, although the tolerated range for the luminance values changes in accordance with the intensity ratio α, so long as the values are within the tolerated range, out of the two images that are combined, only one out of the two images can be viewed at each of the two viewing positions. Accordingly, it is possible to present different images to the different viewing positions.

In the present embodiment, the projectors 20a, 20b themselves may be identical to existing rear projectors. The provision of the image processing apparatus 10 that generates the image signals supplied to the two projectors is novel to the present invention, and so long as the image processing apparatus 10 is provided, the remaining parts of the construction can be realized comparatively easily using existing constructions.

The images displayed on the screen are subject to no limits on the number of pixels or the like, and therefore there are no sacrifices in resolution due to two images being simultaneously displayed. However, as shown in FIGS. 10A and 10B, since the range of luminances of each pixel that can be used becomes somewhat limited in accordance with the intensity ratio between the two images, color reproducibility can be somewhat deteriorated at certain pixel positions in the images compared to when images are not combined. However, it does not really matter when the two images are viewed from the respective viewing positions.

Note that although a construction where two projectors are provided for one screen is used in the embodiment described above, as one example, it is also possible to use a multiscreen construction where a plurality of screens are consecutively disposed vertically or horizontally (or in a vertical and horizontal matrix), to dispose two projectors behind each of the screens, and to display a combined image via the processing described above using each screen and pair of two projectors. This makes it possible to display large-sized images.

Although processing is carried out in the embodiment described above with the two viewing positions, i.e., the positions at which the respective images can be viewed having been decided in advance, as one example, it is also possible to detect the viewing positions of observers (i.e., viewers) who are positioned in front of the screen and to carry out image processing in accordance with the intensity ratios of the light from the two projectors at the detected viewing positions.

Figure 15:
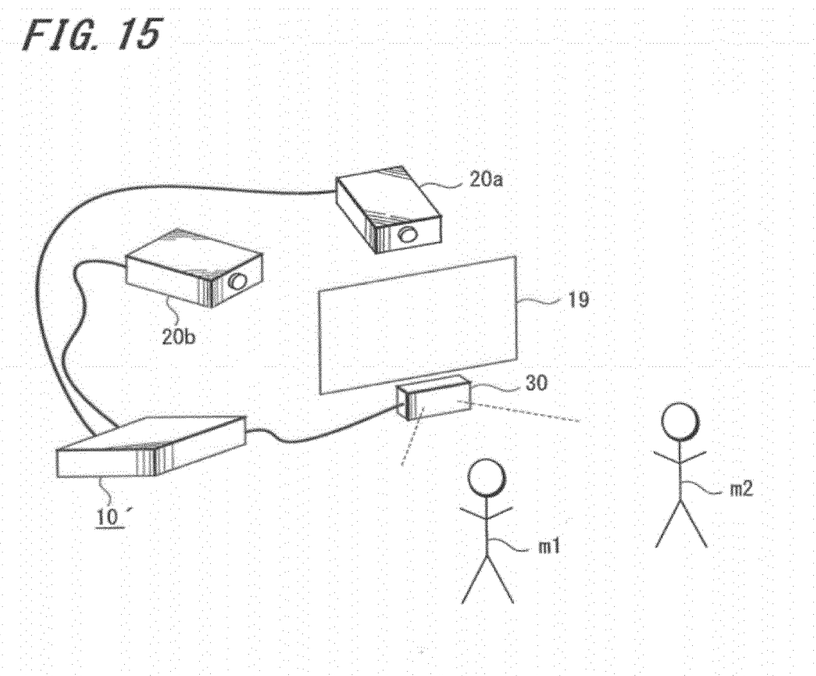
FIG. 15 is a diagram showing an example construction according to another embodiment of the present invention.

FIG. 15 is a diagram showing an example of the system construction in such case. A sensor 30 that detects the positions of persons is provided in front of a screen 19 onto which the two projectors 20a, 20b project images, and the sensor 30 detects the positions (angle positions) of up to two viewers m1, m2. As the sensor 30, as one example, images may be picked up with a camera and the positions of the viewers may be detected from the picked up images. The detected information produced by the sensor 30 is sent to an image processing apparatus 10'. The construction of the image processing apparatus 10' differs from the image processing apparatus 10 shown in FIG. 1 in that the setting of the intensity ratio in the α setting unit 17 shown in FIG. 1 is carried out as appropriate in accordance with the detected viewers m1, m2.

By using this construction, it is possible to appropriately change the way images are combined in accordance with the positions of the viewers and to thereby respond to movement of the viewers.

Note that with the construction shown in FIG. 15, as one example, when only one viewer has been detected, it is also possible to display only the image to be presented to such viewer (that is, without combining images). Conversely, when two viewers have been detected, the combining process described above in the embodiment may be carried out to present separate images to the respective viewers.

FIG. 15 shows one example construction for detecting viewers, but another construction may be used. As one example, it is possible to have the viewer hold a transmitting apparatus that transmits position information, to receive a signal from the transmitting apparatus at the image processing apparatus, and to determine the angle position from the screen based on the received signal.

In addition, although two different angle positions for viewing are set in the horizontal direction and different images are displayed from the respective viewing angles in the embodiment described above, it is also possible to set two different angle positions for viewing in the vertical direction. It is also possible to use angles in a combination of the horizontal and vertical directions.

In addition, it is also possible to change not only the angle but also the distance from the screen to the viewing position and to display different images at the respective positions. More specifically, it is possible to set an image to be displayed when viewing from a specified position near the screen and an image to be displayed when viewing from a specified position far from the screen. In this case also, since the angle when each display point (i.e., pixel position) on the screen is viewed from the respective viewing positions will differ at the two viewing positions, it is possible to carry out correction using the same calculation processing as the correction processing in the embodiment described above.

Also, although the case where the present invention is applied to a rear-projection type apparatus where the projectors are disposed behind the screen has been described in the embodiment above, it is also possible to use a construction where two projectors are disposed in front of the screen (i.e., on the viewers' side of the screen) and images are projected from two projectors on the same region of the screen to superimpose and combine the images.

Also, although a construction where a dedicated image processing apparatus that processes image signals is provided has been described in the above embodiment, it is also possible to use a construction where a board, card, or the like that corresponds to an input unit or output unit of an image signal inside the image processing apparatus of the above embodiment is attached to a personal computer apparatus that carries out various types of data processing and the same processing is carried out by software processing by a calculation processing means inside the computer apparatus. The software provided in such computer apparatus may be distributed on various types of medium such as a disk or a semiconductor memory and then installed, or may be downloaded via a transfer medium such as the Internet.

It should be understood by those skilled in the art that various modifications, combinations, sub-combinations and alterations may occur depending on design requirements and other factors insofar as they are within the scope of the appended claims or the equivalents thereof.

What is claimed is:

1. An image signal processing apparatus that receives an input of a first input image signal and a second input image signal and generates first and second projection image signals for projecting projection images from a first projector and a second projector so as to be superimposed on a screen, the image signal processing apparatus comprising:
a storage unit that stores, for each projection position on the screen, a first intensity ratio between projected light from the first projector and projected light from the second projector when viewing from a first viewing position and a second intensity ratio between projected light from the first projector and projected light from the second projector when viewing from a second viewing position that differs from the first viewing position;
an intensity correcting unit that adds the first input image signal and the second input image signal in proportions set for generating the first projection image signal according to the first intensity ratio and the second intensity ratio stored in the storage unit for each projection position, and adds the first input image signal and the second input image signal in proportions set for generating the second projection image signal according to the first intensity ratio and the second intensity ratio stored in the storage unit for each projection position; and
an output unit that supplies the first projection image signal generated by addition by the intensity correcting unit to the first projector and supplies the second projection image signal generated by addition by the intensity correcting unit to the second projector.

2. An image signal processing apparatus according to claim 1,
further comprising an adjusting unit that adds constants, which correspond to grayscale levels of the first and second input image signals, to the first and second input image signals, and multiplies the first and second input image signals by values corresponding to luminance scales of the first and second input image signals.

3. An image signal processing apparatus according to claim 1,
further comprising a projection conversion processing unit that carries out correction on the first and second input image signals to correct distortion in projected forms of light projected onto the screen by the first and second projectors.

4. An image signal processing apparatus according to any of claims 1 to 3,
further comprising a first projector that projects projection images based on the first projection image signal outputted by the output unit onto the screen and a second projector that projects projection images based on the second projection image signal outputted by the output unit onto the screen.

5. An image signal processing method that generates, from a first input image signal and a second input image signal that have been inputted, first and second projection image signals for projecting projection images from a first projector and a second projector so as to be superimposed on a screen, the image signal processing method comprising:
storing, for each projection position on the screen, a first intensity ratio between projected light from the first projector and projected light from the second projector when viewing from a first viewing position and a second intensity ratio between projected light from the first projector and projected light from the second projector when viewing from a second viewing position that differs from the first viewing position;
adding the first input image signal and the second input image signal in proportions set for generating the first projection image signal according to the first intensity ratio and the second intensity ratio stored for each projection position;
adding the first input image signal and the second input image signal in proportions set for generating the second projection image signal according to the first intensity ratio and the second intensity ratio stored for each projection position; and
supplying the first projection image signal generated by addition to the first projector and supplying the second projection image signal generated by addition to the second projector.

6. A computer program for causing a calculation processing apparatus to implement and execute image signal processing that generates, from a first input image signal and a second input image signal that have been inputted, first and second projection image signals for projecting projection images from a first projector and a second projector so as to be superimposed on a screen, the image signal processing comprising:
storing, for each projection position on the screen, a first intensity ratio between projected light from the first projector and projected light from the second projector when viewing from a first viewing position and a second intensity ratio between projected light from the first projector and projected light from the second projector when viewing from a second viewing position that differs from the first viewing position;

adding the first input image signal and the second input image signal in proportions set for generating the first projection image signal according to the first intensity ratio and the second intensity ratio stored for each projection position;

adding the first input image signal and the second input image signal in proportions set for generating the second projection image signal according to the first intensity ratio and the second intensity ratio stored for each projection position; and supplying the first projection image signal generated by addition to the first projector and supplying the second projection image signal generated by addition to the second projector.

7. An image projecting system that receives an input of a first input image signal and a second input image signal, generates first and second projection image signals for projecting projection images from a first projector and a second projector so as to be superimposed on a screen, and supplies the first and second projection image signals to the first and second projectors to project projection images onto the screen, the image projecting system comprising:

a storage unit that stores, for each projection position on the screen, a first intensity ratio between projected light from the first projector and projected light from the second projector when viewing from a first viewing position and a second intensity ratio between projected light from the first projector and projected light from the second projector when viewing from a second viewing position that differs from the first viewing position;

an intensity correcting unit that adds the first input image signal and the second input image signal in proportions set for generating the first projection image signal according to the first intensity ratio and the second intensity ratio stored in the storage unit for each projection position, and adds the first input image signal and the second input image signal in proportions set for generating the second projection image signal according to the first intensity ratio and the second intensity ratio stored in the storage unit for each projection position;

a first projector that outputs projected light based on the first projection image signal generated by addition by the intensity correcting unit onto the screen; and a second projector that outputs projected light based on the first projection image signal generated by addition by the intensity correcting unit onto the screen.

8. An image projecting system according to claim 7, further comprising an adjusting unit that adds constants, which correspond to grayscale levels of the first and second input image signals, to the first and second input image signals, and multiplies the first and second input image signals by values corresponding to luminance scales of the first and second input image signals.

9. An image projecting system according to claim 7, further comprising a projection conversion processing unit that carries out correction on the first and second input image signals to correct distortion in projected forms of light projected onto the screen by the first and second projectors.

10. An image projecting method that receives an input of a first input image signal and a second input image signal, generates first and second projection image signals for projecting projection images from a first projector and a second projector so as to be superimposed on a projection region of a screen, and supplies the first and second projection image signals to the first and second projectors to project projection images onto the screen, the image projecting method comprising:

storing, for each projection position on the screen, a first intensity ratio between projected light from the first projector and projected light from the second projector when viewing from a first viewing position and a second intensity ratio between projected light from the first projector and projected light from the second projector when viewing from a second viewing position that differs from the first viewing position;

adding the first input image signal and the second input image signal in proportions set for generating the first projection image signal according to the first intensity ratio and the second intensity ratio for each projection position;

adding the first input image signal and the second input image signal in proportions set for generating the second projection image signal according to the first intensity ratio and the second intensity ratio for each projection position; and outputting projected light based on the first projection image signal generated by addition from the first projector onto the screen and outputting projected light based on the second projection image signal generated by addition from the second projector onto the screen.

11. A computer program for causing a calculation processing apparatus to implement and execute a process that receives an input of a first input image signal and a second input image signal, generates first and second projection image signals for projecting projection images from a first projector and a second projector so as to be superimposed on a screen, and supplies the first and second projection image signals to the first and second projectors to project projection images onto the screen, the process comprising:

storing, for each projection position on the screen, a first intensity ratio between projected light from the first projector and projected light from the second projector when viewing from a first viewing position and a second intensity ratio between projected light from the first projector and projected light from the second projector when viewing from a second viewing position that differs from the first viewing position;

adding the first input image signal and the second input image signal in proportions set for generating the first projection image signal according to the first intensity ratio and the second intensity ratio for each projection position;

adding the first input image signal and the second input image signal in proportions set for generating the second projection image signal according to the first intensity ratio and the second intensity ratio for each projection position; and outputting projected light based on the first projection image signal generated by addition from the first projector onto the screen and outputting projected light based on the second projection image signal generated by addition from the second projector onto the screen.

* * * * *